(12) United States Patent
Omori

(10) Patent No.: US 6,418,011 B2
(45) Date of Patent: Jul. 9, 2002

(54) MOUNTING APPARATUS, MOUNTING METHOD, AND RECORDING/REPRODUCING APPARATUS

(75) Inventor: Kiyoshi Omori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/882,794

(22) Filed: Jun. 18, 2001

(30) Foreign Application Priority Data

Jun. 20, 2000 (JP) ........................................ 2000-189752

(51) Int. Cl.[7] .............................. H05K 5/00; G06F 1/16
(52) U.S. Cl. ...................... 361/683; 361/685; 361/724; 361/725; 361/727; 439/928.1; 312/223.1; 312/223.2; 248/65; 248/73
(58) Field of Search ................................. 361/685, 683, 361/724, 725, 726, 727; 439/53, 152, 157, 928.1; 312/223.1, 223.2, 222, 349, 350; 248/65, 73, 534, 535

(56) References Cited

U.S. PATENT DOCUMENTS

| 5,481,431 A | * | 1/1996 | Siahpolo et al. ............ 361/685 |
| 5,510,955 A | * | 4/1996 | Taesang ...................... 361/685 |
| 5,513,068 A | * | 4/1996 | Girard ......................... 361/685 |
| 5,584,396 A | * | 12/1996 | Schmitt ........................ 211/26 |
| 6,034,868 A | * | 3/2000 | Paul ............................ 361/684 |
| 6,075,694 A | * | 6/2000 | Mills et al. .................. 361/685 |
| 6,122,173 A | * | 9/2000 | Felcman et al. ............ 361/726 |
| 6,317,318 B1 | * | 1/2001 | Kim ............................. 361/685 |
| 6,256,195 B1 | * | 7/2001 | Liao ............................ 361/685 |

* cited by examiner

Primary Examiner—Darren Schuberg
Assistant Examiner—David Foster
(74) Attorney, Agent, or Firm—Jay H. Maioli

(57) ABSTRACT

For simply mounting an optical disk drive device or the like within a computer body to locate it accurately, a channel-shaped adaptor is mounted detachably on the upper part of the drive device, an inner guide pin and vertical guide groove are mutually located in a longitudinal direction, the drive device is horizontally inserted into a mounting frame, the drive device is placed on a place bed, and the adaptor is located in longitudinal and vertical directions within the mounting frame by a plate spring part compressing an outer guide pin.

11 Claims, 23 Drawing Sheets

SECTION A-A

MOUNTING APPARATUS, MOUNTING METHOD, AND RECORDING/REPRODUCING APPARATUS

BACKGROUND OF THE INVENTION

1. Field of the Invention

The present invention belongs to a technical field of a mounting apparatus for computer peripheral equipment for detachably mounting, within a computer body, an optical disk drive device, a floppy disk drive device, a card type recording medium recording/reproducing device, a tape-like recording medium recording/reproducing device, and other various computer peripheral equipment.

2. Description of the Related Art

As shown in FIG. 22, a plurality of openings 2 are formed in a control panel 1a of a computer body 1 of a tower type (a longitudinal type) or the like, and an optical disk drive device 3 and other various computer peripheral equipment 4 are mounted in the plurality of upper and lower openings 2 horizontally and detachably.

A mounting apparatus common to the devices for mounting the optical disk drive device 3 into the computer body 1 is constituted as shown in FIG. 23 such that four threaded holes (holes having female threads subjected to tapping in the inner circumference) 5 are formed in advance on both left and right sides 3b of an outer cover 3a of the optical disk drive device 3 or the like and at a predetermined position; that a mounting frame 6 formed of sheet metal into a rectangular shape is fixedly mounted within the computer body 1; and that a front panel 1a formed of synthetic resin of the computer body 1 is removed, one or more optical disk drive devices 3 are inserted horizontally in a direction of arrow a (before and behind) into the mounting frame 6, two stop screws 7 inserted from both left and right plate parts 6a of the mounting frame 6 are selectively connected to two out of four threaded holes 5 on both left and right sides 3b of the optical disk drive device 3, and the one or more optical disk drive devices 3 are screwed from both left and right sideways of the one mounting frame 6.

However, in this mounting apparatus, when the optical disk drive device 3 and the like are screwed to both left and right plate parts 6a of the mounting frame 6 by means of two stop screws 8, a pair of left and right side panels 1b made of sheet metal or the like screwed to the computer body 1 by means of a number of stop screws 6 also have to be removed every time, and mounting and dismounting of the front panel 1a and the side panel 1b and many screwing works are necessary, greatly deteriorating operativeness. Development of a new mounting apparatus has been strongly desired.

In view of the foregoing, in recent years, an adaptor 11 shown in FIG. 24 has been developed. The adaptor 11 is composed of three parts, i.e., a base plate 12 subjected to press working by a thick plate spring, and a pair of thin left and right plate springs 13 mounted in parallel internally of front end portions of both left and right plate parts 12a folded vertically upward from both left and right edges of the base plate 12, the pair of left and right plate springs 13 being caulked to the inside of the front end portion of the base plate 12 by means of a pair of caulking pins 14. The base plate 12 is formed with four screw insert holes 15 and is horizontally formed on both left and right end edges with a plurality of projections 16 spaced apart in a longitudinal direction, both the left and right plate parts 12a being vertically formed on the rear end side with a pair of left and right stopper parts 17. The pair of left and right plate springs 13 are vertically and integrally formed with a pair of left and right gripping parts 18 and stopping spring parts 19.

When the optical disk drive device 3 and the like are mounted internally of the computer body 1 shown in FIG. 22, first, four stop screws 20 inserted, from downward, into four screw insert holes of the base plate 12 of the adaptor 11 are connected to four threaded holes 21 formed in the bottom 3c of the optical disk drive device 3 or the like, the base plate 12 of the adaptor 11 is screwed horizontally to the bottom 3c of the optical disk drive device 3 or the like, and the pair of left and right gripping parts 18 and the stopping spring parts 19 are arranged vertically at both side positions of both the left and right sides 3b of the optical disk drive device 3 or the like.

The adaptor 11 is inserted integrally with the optical disk drive device 3 or the like horizontally in a direction of arrow a into the mounting frame 6 shown in FIG. 22, and the plurality of left and right projections 16 are placed horizontally making use of own weight on a pair of leaf and right place beds (not shown) formed horizontally internally of both the left and right plate parts 6a of the mounting frame 6. Then, the pair of left and right stopper parts 17 are placed in contact with a pair of left and right stopper parts (not shown) formed vertically at deep positions internally of both the left and right plate parts 6a of the mounting frame 6, and the pair of left and right stopping spring parts 19 are mounted so as to be detachable making use of elasticity on a pair of left and right spring stop parts (not shown) formed vertically at front positions internally of both the left and right plate parts 6a of the mounting frame 6.

If the adaptor 11 shown in FIG. 24 is used, the pair of left and right side panels 1b need not be detachably mounted every time but the optical disk drive device 3 or the like can be mounted integral with the adaptor 11 by one-touch operation merely by inserting them into the mounting frame 6 horizontally in a direction of arrow a, unlike the case where the optical disk drive device shown in FIG. 23 is screwed by means of four stop screws 7 to both the left and right plate parts 6a of the mounting frame 6 shown in FIG. 22. When the optical disk drive device 3 or the is removed from the mounting frame 6, the front panel 1a of the computer body 1 is removed and the pair of left and right gripping parts 18 of the adaptor 11 are merely strongly pulled in a direction of arrow b in FIG. 22 on the forward side whereby the disk drive device 3 or the like can be removed integral with the adaptor 11 in a direction of arrow b, which is convenient.

However, the mounting apparatus using the adaptor 11 shown in FIG. 24 is not of the type in which the optical drive device 3 or the like is directly placed on the pair of left and right place bed parts of the mounting frame 6, but of the type in which the optical disk drive device 3 or the like is placed making use of own weight on the pair of left and right place bed parts internally of the mounting frame 6 by a plurality of projections 16 on both the left and right sides of the base plate 12 of the adaptor 11. Therefore, as the base plate 12, a sheet metal which is thick and strong enough to carry weight of the optical disk drive device 3 has to be used to result in an increase of weight and higher cost. Further, a longitudinal (directions of arrows a and b) backlash of the optical disk device 3 inserted into the mounting frame 6 to the mounting frame 6 can be prevented but the vertical backlash is prevented relying upon only the sum total of the optical disk drive device 3 and the adaptor 11, because of which the vertical backlash cannot be prevented completely.

Moreover, since the adaptor 11 itself is composed of three parts, i.e., the base plate 12, and the pair of left and right plate springs 13, and has the construction in which the pair of left and right plate springs 13 are caulked to the inside of the front end sides of the left and right plate parts 12a of the base plate 12 using a plurality of caulking pins 14, there many numbers of parts and many assembling steps of the adaptor 11 itself, resulting in a high unit price of the adaptor 11 itself. In addition, the work for screwing the base plate 12 of the adaptor 11 to the bottom 3c of the optical disk drive device 3 or the like by four stop screws 20 is troublesome, posing a problem that operativeness is deteriorated.

SUMMARY OF THE INVENTION

It is an object of the present invention to provide a mounting apparatus for computer peripheral equipment capable of solving all the problems noted above at one effort.

For achieving the above-described object, a mounting apparatus, a mounting method, and a recording/reproducing apparatus according to the present invention uses an adaptor formed into a shape having a downwardly facing open side formed by a top plate part and both left and right sides suspended downward from both left and right end edges of the top plate part The adaptor is detachably mounted, from the top, on computer peripheral equipment of an optical disk drive device or the like whereby the adaptor is located in a longitudinal direction with respect to the computer peripheral equipment by first locating means. Then, the computer peripheral equipment is inserted integral with the adaptor into a mounting frame mounted within the computer body in a longitudinal direction, and the computer peripheral equipment is placed horizontally on a bottom place bed of a mounting frame inserting part. At this time, the adaptor is located elastically with respect to longitudinal direction and vertical direction into the mounting frame by second locating means.

In the mounting apparatus, the mounting method, and the recording/reproducing apparatus according to the present invention constituted as described above, the adaptor having a shape with a downwardly facing open side is mounted detachably, from the top, on the computer peripheral equipment of the optical disk drive device or the like whereby the adaptor is located with respect to the computer peripheral equipment in a longitudinal direction by the first locating means, and so, the adaptor need not be screwed every time to the computer peripheral equipment. Then, the computer peripheral equipment is inserted integral with the adaptor into a mounting frame mounted within the computer body in a longitudinal direction, and the computer peripheral equipment is placed horizontally on a bottom place bed of a mounting frame inserting part, and so, the adaptor need not at all to carry weight of the computer peripheral equipment. And, the adaptor is located elastically with respect to longitudinal direction and vertical direction into the mounting frame by second locating means, and the computer peripheral equipment is located in a state free from backlash within the mounting frame.

The mounting apparatus for computer peripheral equipment according to the present invention constituted as described above is able to succeed in the following effect.

The adaptor has shape with a downwardly facing open side and is mounted detachably, from the top, on the computer peripheral equipment of the optical disk drive device or the like whereby the adaptor is located with respect to the computer peripheral equipment in a longitudinal direction by the first locating means, and so, the adaptor need not be screwed every time to the computer peripheral equipment; then, the computer peripheral equipment is inserted integral with the adaptor into a mounting frame mounted within the computer body in a longitudinal direction, and the computer peripheral equipment is placed horizontally on a bottom place bed of a mounting frame inserting part, and so, the adaptor need not at all to carry weight of the computer peripheral equipment; further, the adaptor is located elastically with respect to longitudinal direction and vertical direction into the mounting frame by second locating means, and the computer peripheral equipment is located in a state free from backlash within the mounting frame. For the reasons mentioned above, the computer peripheral equipment can be mounted in and removed from the mounting frame extremely simply by one-touch operation to remarkably enhance operativeness of the mounting and removal. Moreover, particularly, since the adaptor can be constituted by a single part, the construction is very simple, and no load of the computer peripheral equipment is exerted whereby the apparatus which is light and inexpensive can be manufactured by thin sheet meta or synthetic resin molding parts, thus capable of achieving a considerable cost down due to the lower unit price of parts along with the fact that no stop screw is used.

Further, the first locating means can be constituted simply by a vertical guide groove and a guide pin, and longitudinal locating of an adaptor to computer peripheral equipment can be accomplished simply and accurately.

Further, the second locating means for locating the computer peripheral equipment onto the place bed of the mounting frame is constituted by at least a guide pin, and a plate spring part crimped at right angles on the place bed of the mounting frame. Therefore, the second locating means can be constituted simply, and the computer peripheral equipment can be located on the place bed simply and accurately.

Since the adaptor can be guided and inserted into the mounting frame by a plurality guide pins and a plurality of horizontal guide grooves, insertion and removing of the adaptor from the mounting frame are accomplished smoothly.

Since a pair of left and right gripping parts are provided on front ends of both left and right plate parts of an adaptor, the computer peripheral equipment can be pulled out of the mounting frame.

DESCRIPTION OF THE PREFERRED EMBODIMENTS

Figure 1:
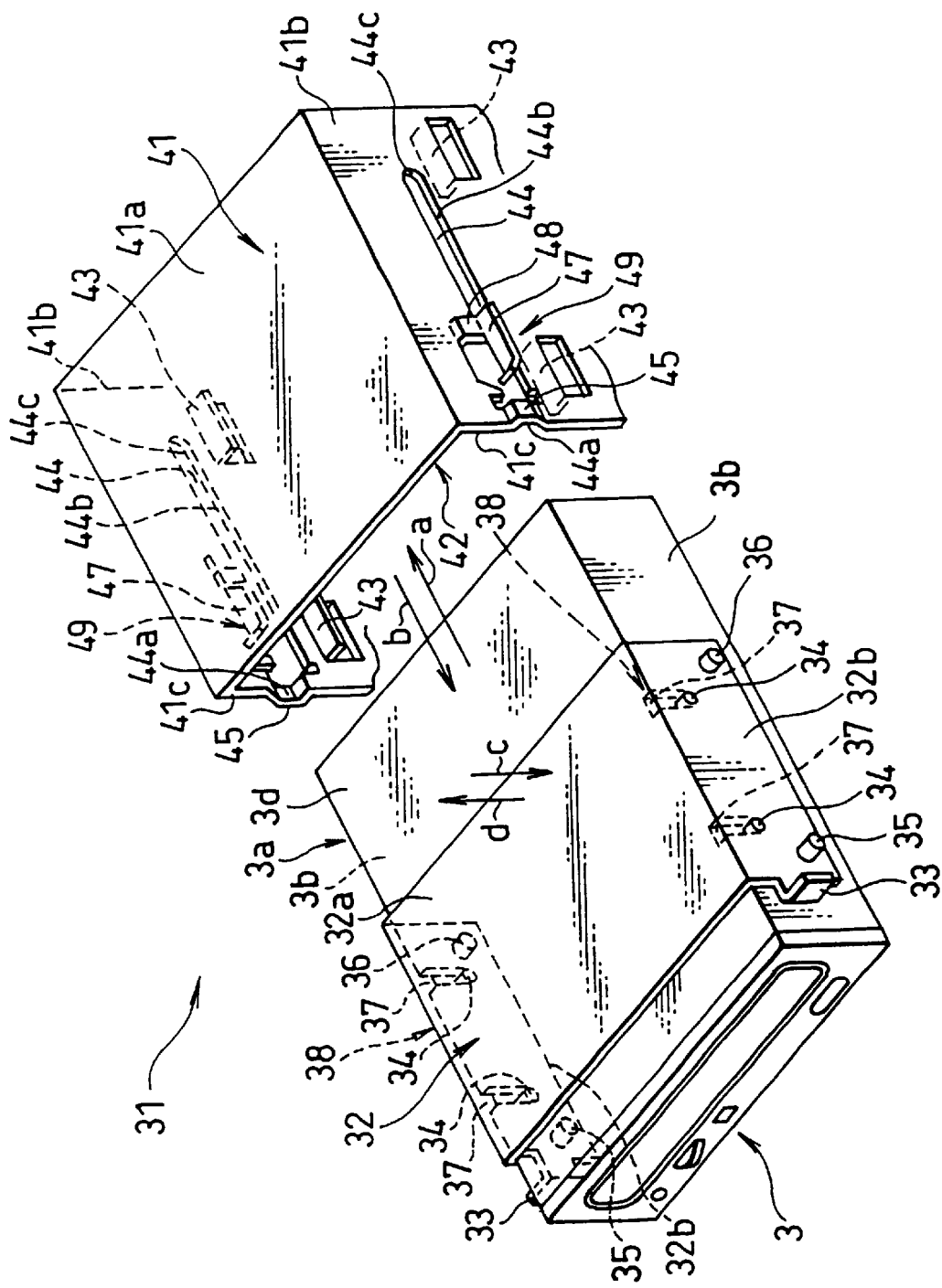
FIG. 1 is a perspective view showing taking-out and putting in of computer peripheral equipment and an adaptor with respect to a mounting frame for explaining an embodiment of a mounting apparatus for commuter peripheral equipment to which the present invention is applied.
Figure 2:
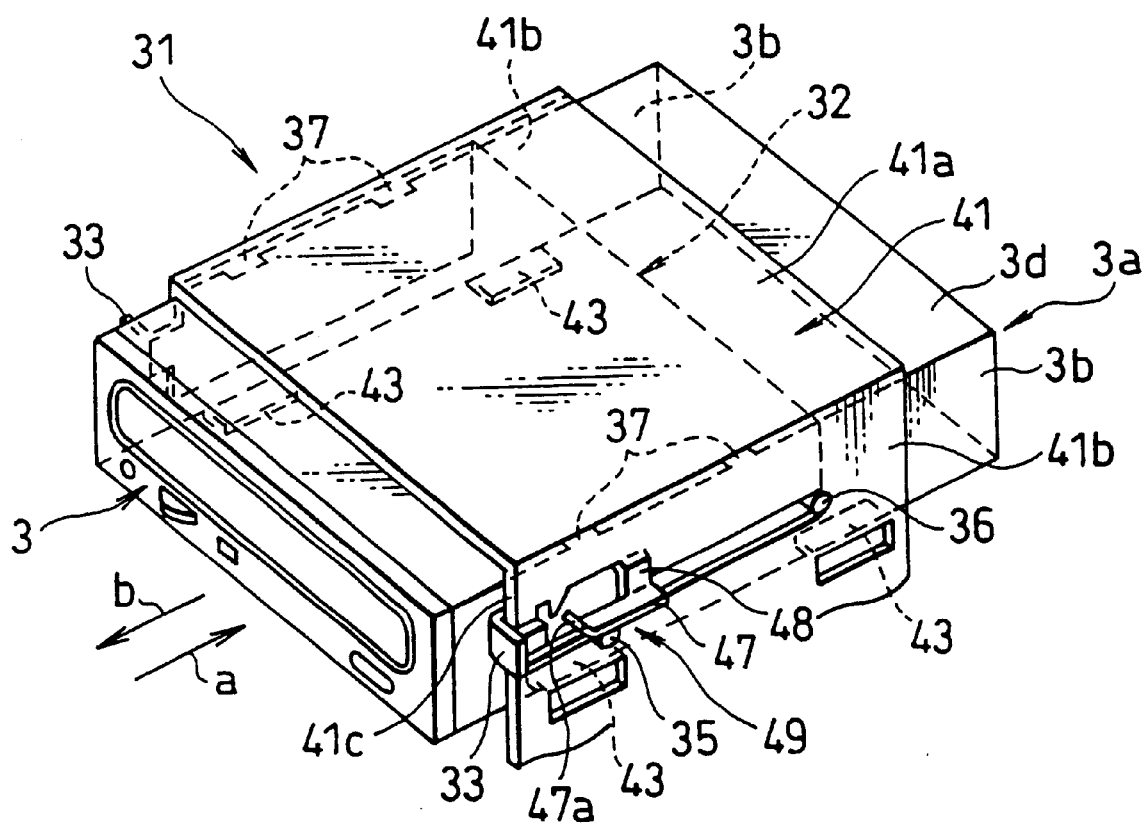
FIG. 2 is a perspective view showing a state that computer peripheral equipment of a mounting apparatus for computer peripheral equipment is inserted into and mounted within a mounting frame integral with an adaptor.

The preferred embodiments of a mounting apparatus for computer peripheral equipment to which the present invention is applied will be described hereinafter with reference to FIGS. 1 to 23.

First, a mounting apparatus 31 according to the present invention uses an adaptor 32 formed by applying press working to sheet metal which is thin in sheet thickness, light in weight, and cheap in unit price of parts, or by synthetic resin molding. On the other hand, for a mounting frame 41 mounted in advance horizontally within a computer body 1 used a material subjected to press working applied to sheet metal which is thick in sheet thickness, and strong, as explained with reference to FIG. 22. One adaptor 32 is sued for one optical drive device 3 or the like which is computer peripheral equipment, but within the mounting frame 41 can be mounted two or more optical disk drive devices 3 or the like in a plurality of upper and lower stages.

The adaptor 32 is formed to be folded into a shape with a downwardly facing open side by a horizontal top plate part 32a and both left and right plate parts 32b horizontally folded downward from both left and right end edges of the top plate part 32a. Both the left and right plate parts 32b are formed on the front end edges with a pair of left and right gripping parts 33 at right angles to both left and right sideways and by being folded symmetrically to left and right. At the same level position displaced to the upper ends of the internal opposed surfaces of both the left and right plate parts 32b, guide pins, i.e., each pair front and behind, four inner guide pins 34 in total are formed at right angles At the same level position displaced to the lower ends of the external surfaces of both the left and right plate parts 32b, guide pins, i.e., each pair front and behind, four inner guide pins 35 and 36 in total are formed at right angles. Four inner guide pins 34 and two outer guide pins 36 in total on the fear end side are formed from short pins, and two outer guide pins 35 in total on the front end side are formed from long pins.

On both left and right sides 3b of an outer cover 3a of the optical disk device 3 or the like, each pair of front and behind, four vertical guide grooves 37 in total with upper ends into which four inner guide pins 34 in total of the adaptor 32 are inserted upward are formed, and first locating means 38 is constituted by four vertical guide grooves 37 in total and four inner guide pins 34 in total of the adaptor 32. Alternatively, the first locating means 38 can be formed by forming four vertical guide grooves 37 in total on both left and right side plate parts 32b of the adaptor 32, opening the lower ends of the vertical guide groove 37, and forming four inner guide pins 34 in total on both left and right sides 34 of the optical disk drive device 3. The first locating means is provided to locate the optical disk drive device 3 and the adaptor 32 so that they are not moved relatively in directions of arrows a and b.

A mounting frame 41 is subjected to press working into a shape having a downwardly facing open side formed of a top plate part 41a, and both left and right plate parts 41b vertically folded downward from both left and right end edges. Both the left and right plate parts 41b are formed internally with two upper and lower stages of insert parts 42 which are insert spaces for the optical disk drive device 3 or the like partitioned into two upper and lower stages, and a pair of left and right place beds 43 horizontally folded internally of both the left and right plate parts 41b are formed at a position corresponding to the bottom of each insert part 42 The pair of left and right place beds 43 on the bottom of the upper stable of the insert part 42 are formed at intervals in two front and behind locations internally of both left and right side plate parts 41b. The pair of left and right place beds 43 on the bottom of the lower stage of the insert part 42 are formed over the whole width of the lower end edges of both left and right side plate parts 41b.

A pair of left and right horizontal guide grooves 44 into which are horizontally inserted four left and right outer guide pins 35 and 36 in total of the adaptor 32 are formed in both left and right plate parts 41b and along a position displaced to the lower side of two upper and lower stages of the insert part 43. Front ends 44a of the pair of left and right horizontal guide grooves 44 are opened t front end edges of both the left and right plate parts 41b. The opened front end 44a portions of the horizontal guide grooves 44 of both the left and right plate parts 41b are reinforced with high strength by reinforcing parts 45 applied with project working into a substantially trapezoid outward from the front ends 41c of both left and right plate parts 41b.

At a position near the front end of lower horizontal surface 44b of each left and right pair of horizontal guide grooves 44, a pair of left and right of guide pin engaging parts 46 in the form of a small circular arc depression for locating a pair of left and right outer guide pins 35 on the front end side are formed, and at the upper parts of the guide pin engaging parts 46, a pair of left and right plate spring parts 47 for elastically biasing the pair of left and right outer guide pins 35 from the top as described later are arranged substantially horizontally. The pair of left and right plate spring parts 47 are subjected to fold working in parallel with, substantially horizontally, both the left and right plate parts 41b from the outside to the forward of the lower end edge of a connection part 48 projected in a lateral direction and in a lower direction from the upper edge portion of the horizontal guide groove 44 of both left and right plate parts 41b, and front ends 47a of the pair of plate spring parts 47 are inclined diagonally forward and upward. Rear ends 44c of the pair of left and right horizontal guide grooves 44 are formed at closed ends, and the rear end 44c is formed at a position slightly lowered from a lower horizontal surface 44b by a difference in level part 44d. The diameter D1 of the rear end 44c is constituted to be slightly larger than the diameter D2 of the pair of left and right outer guide pins 36.

Second locating means 49 is constituted by a pair of left and right guide ins 35 of the adaptor 32, a pair of left and right horizontal guide grooves 44 of the mounting frame 41, a pair of left and right guide pin engaging parts 46, and a pair of left and right plate spring parts 47. The second locating means can be also constituted by forming the pair of left and right guide grooves 44 in both the left and right plate parts 32b of the adaptor 32 in a state that rear ends thereof are opened, forming the a pair of outer guide pins 35 internally of both left and right plate parts 41b of the mounting frame 41, and forming the pair of left and right plate spring parts 47 elastically pressed to the lower sides of the guide pins 35 on both left and right plate parts 32b of the adaptor 32. The second locating means is provided to locate the mounting frame 41 and the adaptor 32 in a horizontal direction and in a vertical direction with respect to the horizontal guide groove 44.

In the following, the order for mounting the optical disk drive device 3 or the like into the mounting frame 41 by the mounting apparatus 31 constituted as described above will be explained with reference to FIGS. 1 to 3, and 12 to 16.

Figure 3:
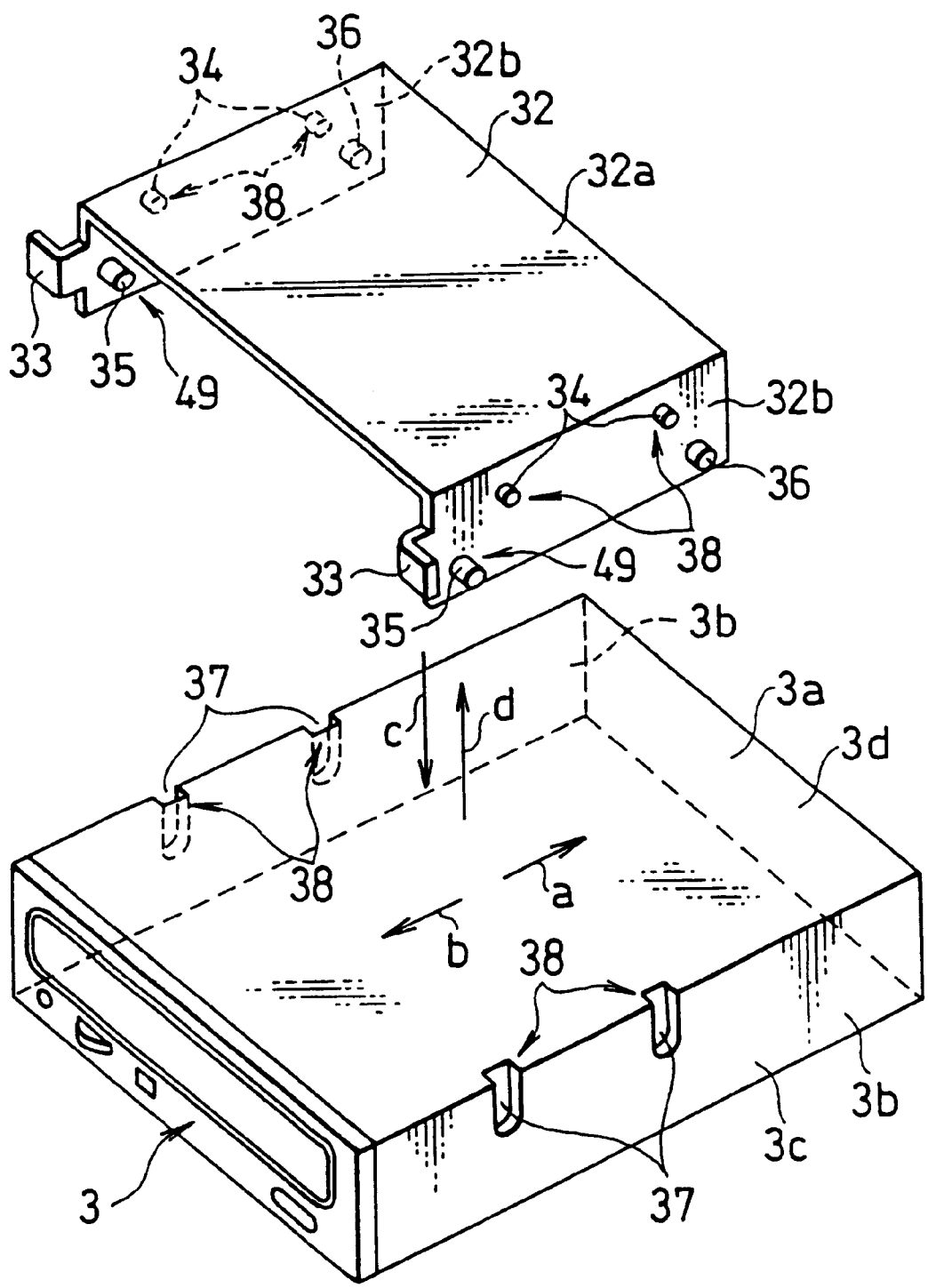
FIG. 3 is a perspective view showing a mounting and dismounting state of computer peripheral equipment of a mounting apparatus for computer peripheral equipment and an adaptor.
Figure 4:
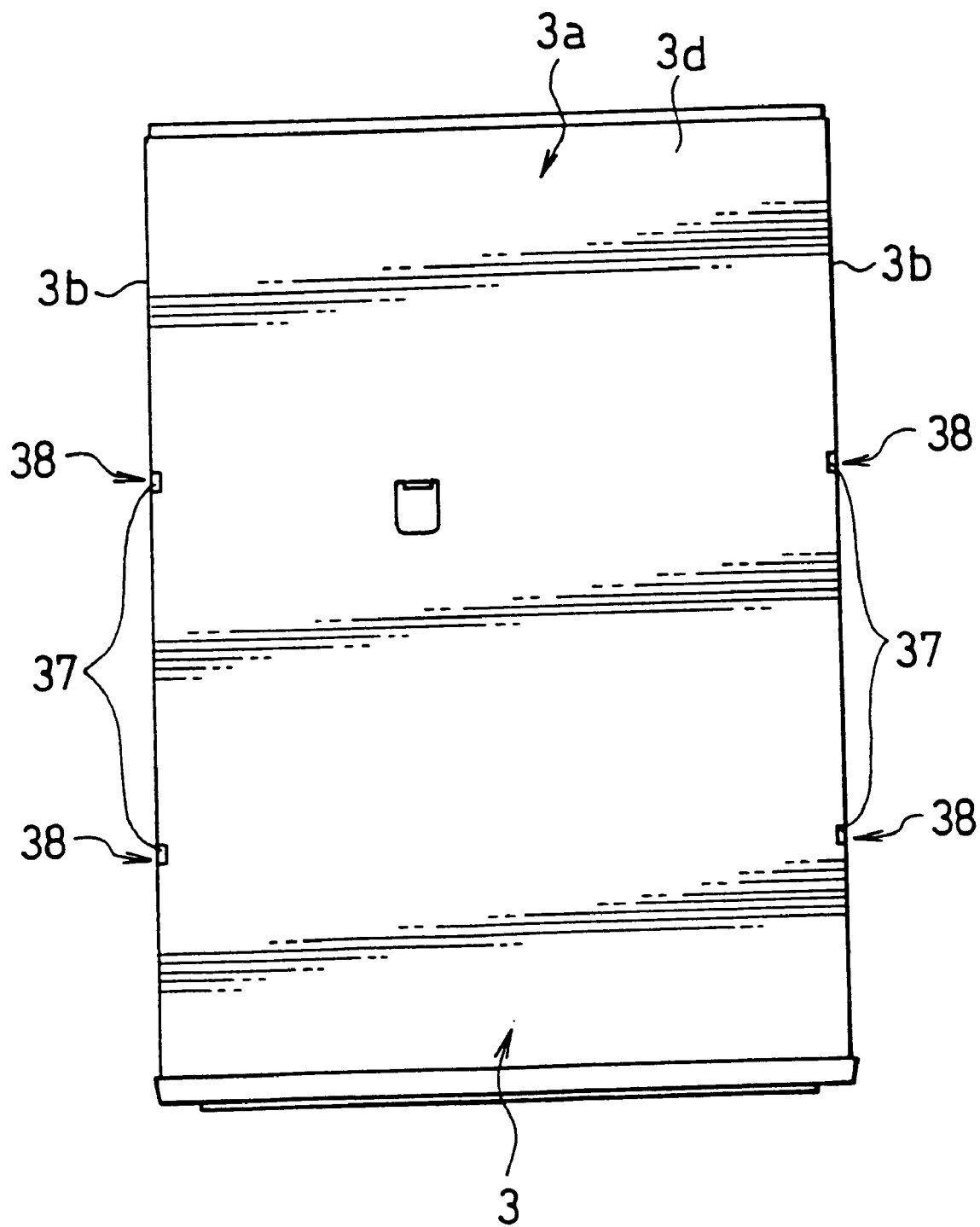
FIG. 4 is a plan view showing computer peripheral equipment of a mounting apparatus for computer peripheral equipment.
Figure 5:
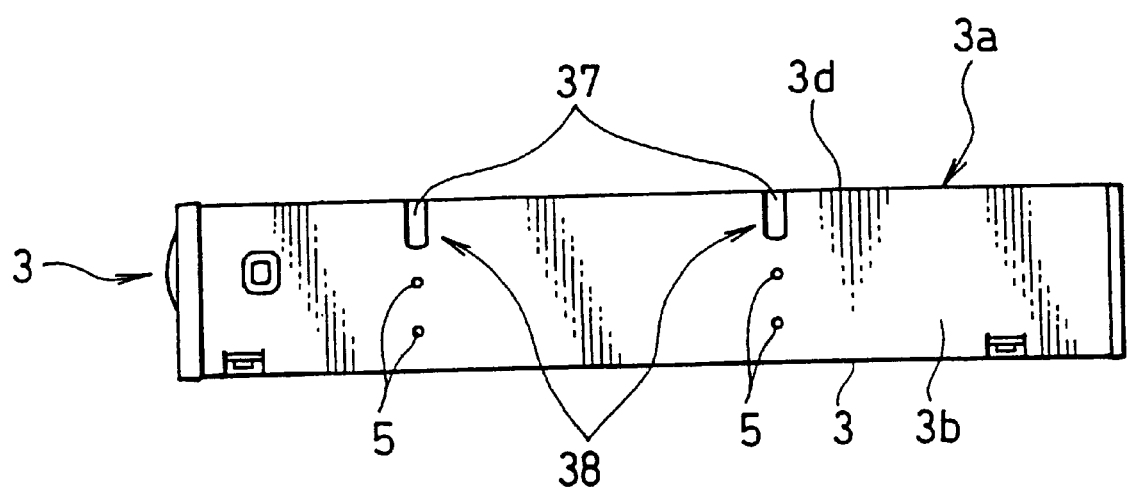
FIG. 5 is a side view of the computer peripheral equipment of FIG. 4.
Figure 6:
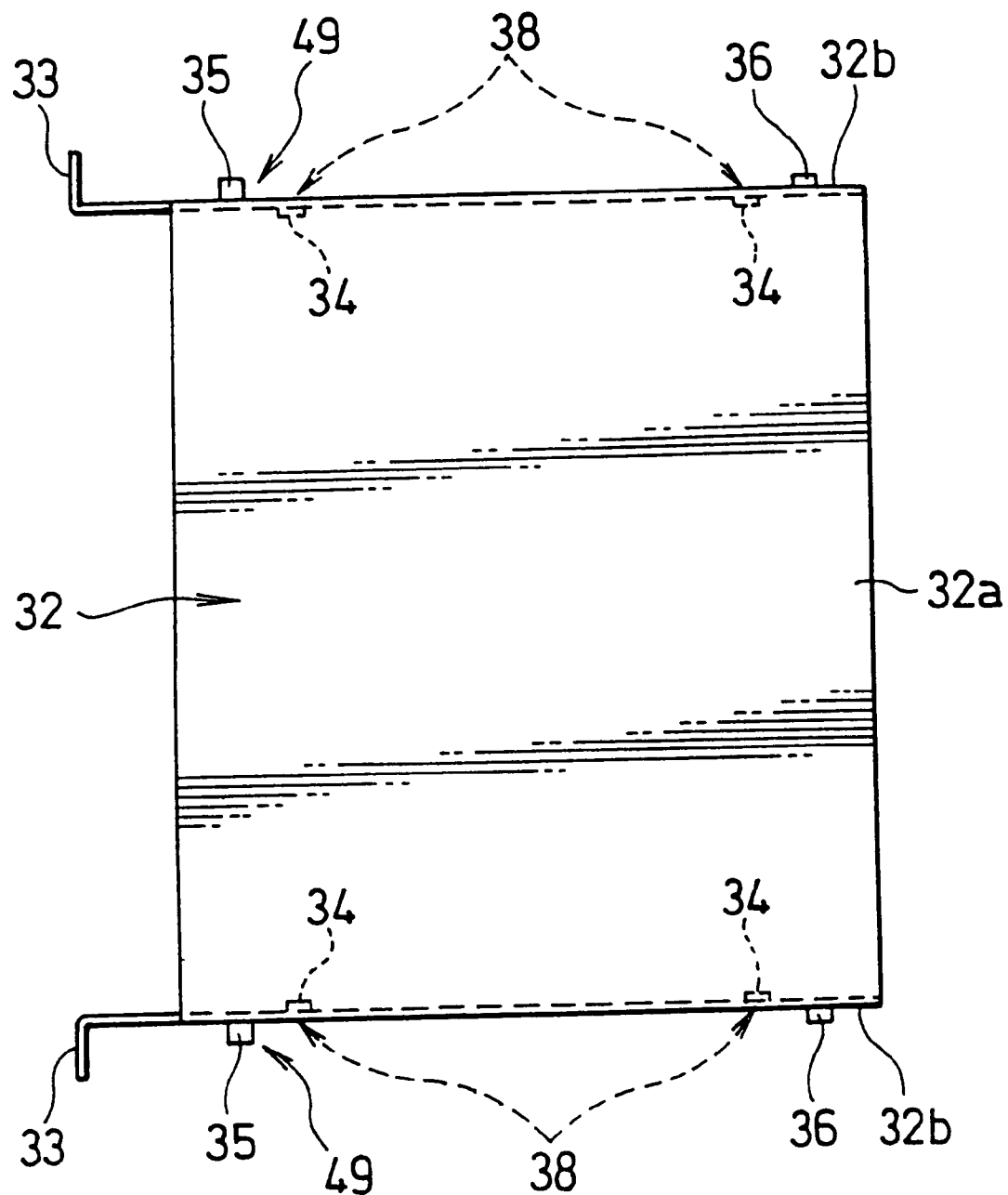
FIG. 6 is a plan view of an adaptor of amounting apparatus for computer peripheral equipment.
Figure 7:
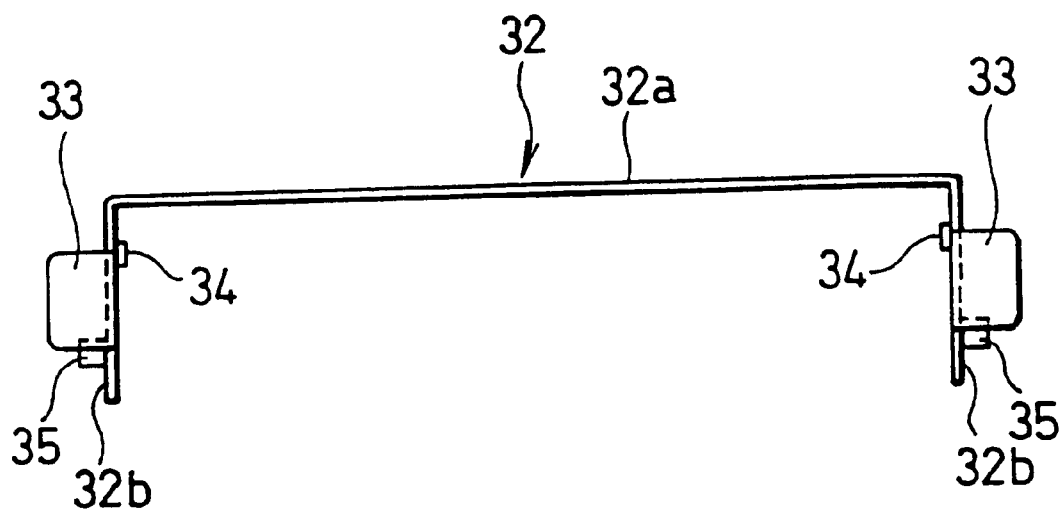
FIG. 7 is a front view of an adaptor of FIG. 6.
Figure 8:
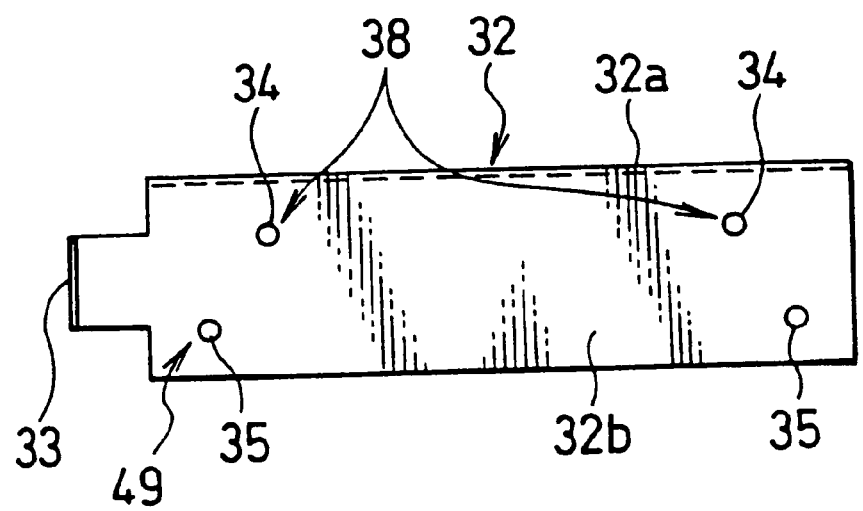
FIG. 8 is a side view of an adaptor of FIG. 6.
Figure 9:
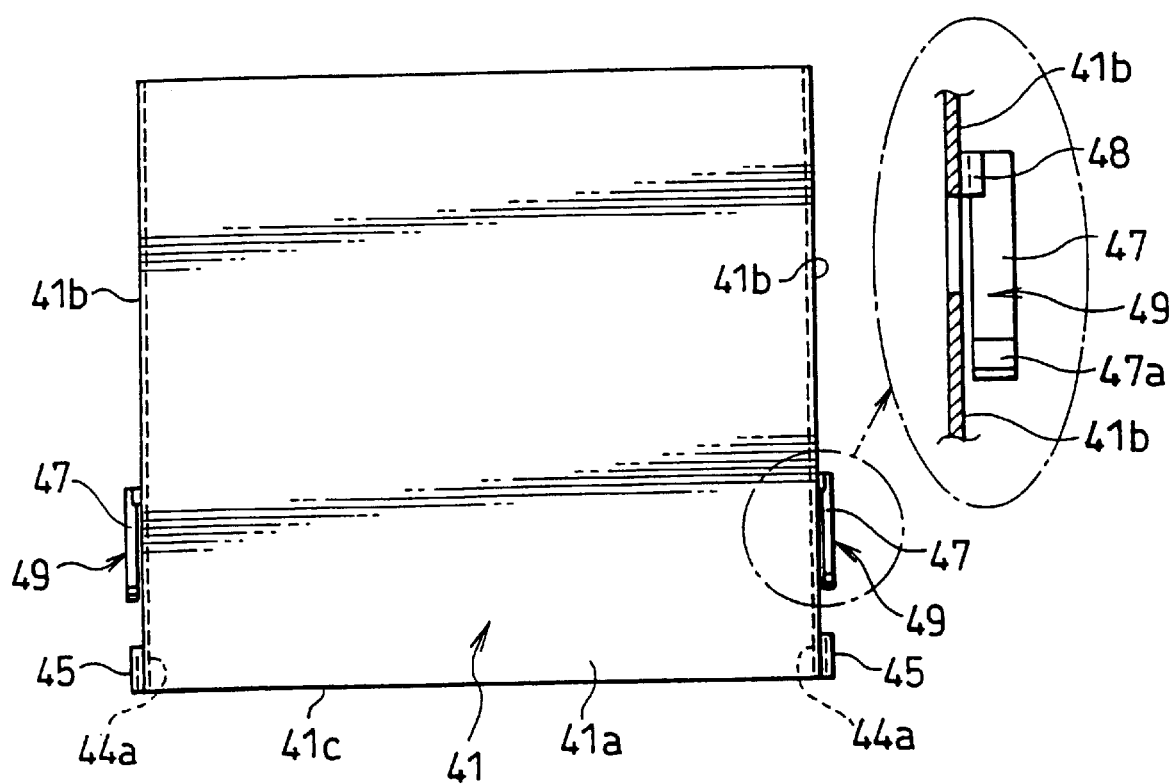
FIG. 9 is a plan view and a partly enlarged cutaway view of a mounting frame of a mounting apparatus for computer peripheral equipment.
Figure 10:
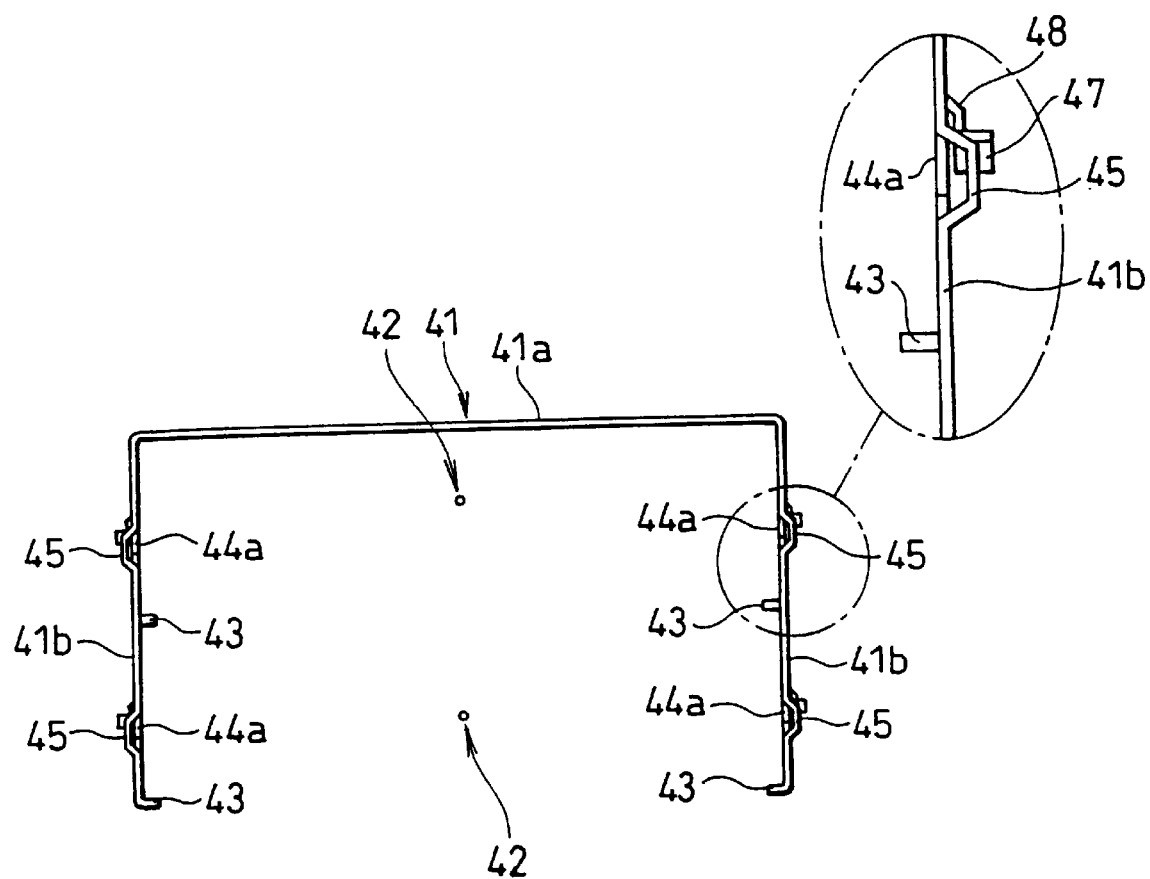
FIG. 10 is a front view and a partly enlarged front view of a mounting frame of FIG. 9.
Figure 11:
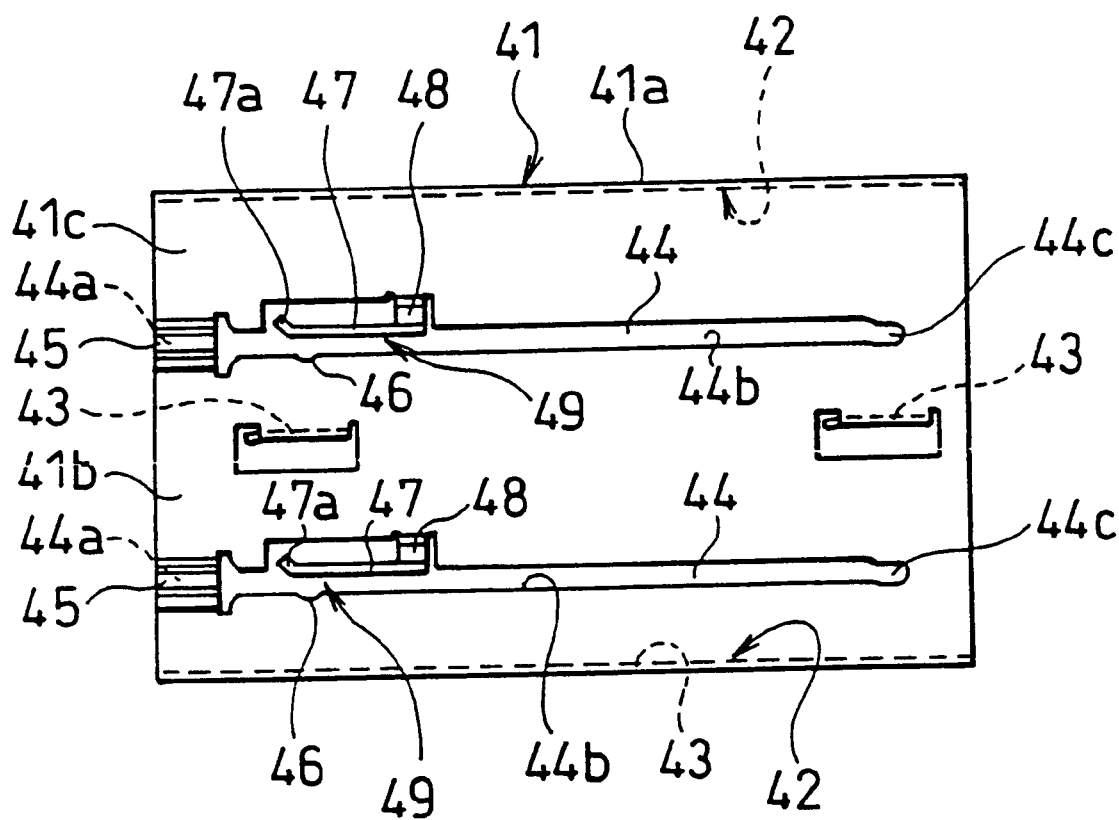
FIG. 11 is a side view of a mounting frame of FIG. 9.
Figure 12:
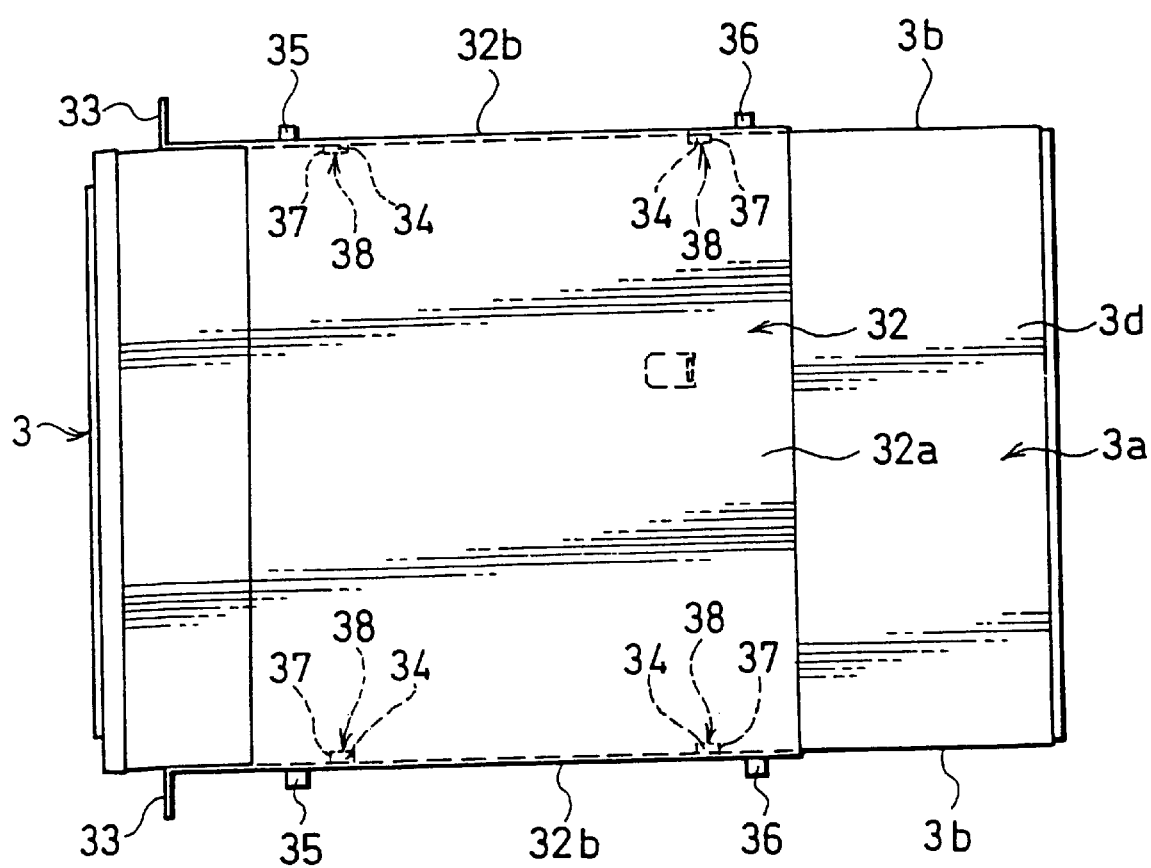
FIG. 12 is a plan view of a state that an adaptor is mounted on an upper part of computer peripheral equipment of a mounting apparatus for computer peripheral equipment.
Figure 13:
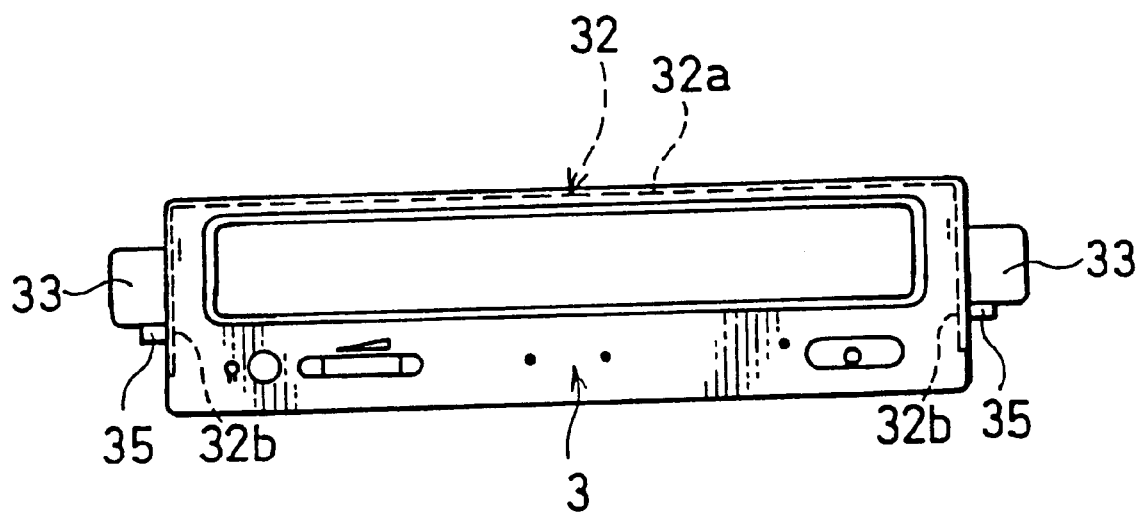
FIG. 13 is a front view of computer peripheral equipment and an adaptor of FIG. 12.
Figure 14:
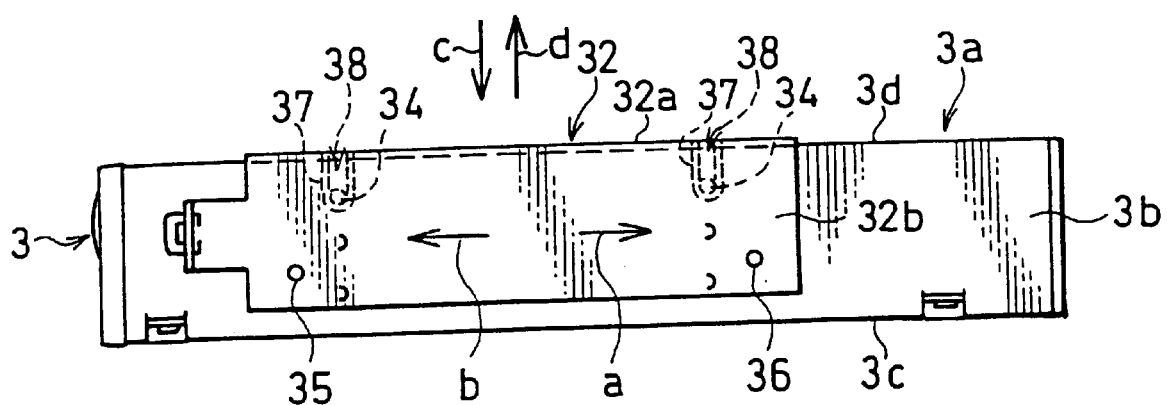
FIG. 14 is a side view of computer peripheral equipment and an adaptor of FIG. 12.
Figure 15:
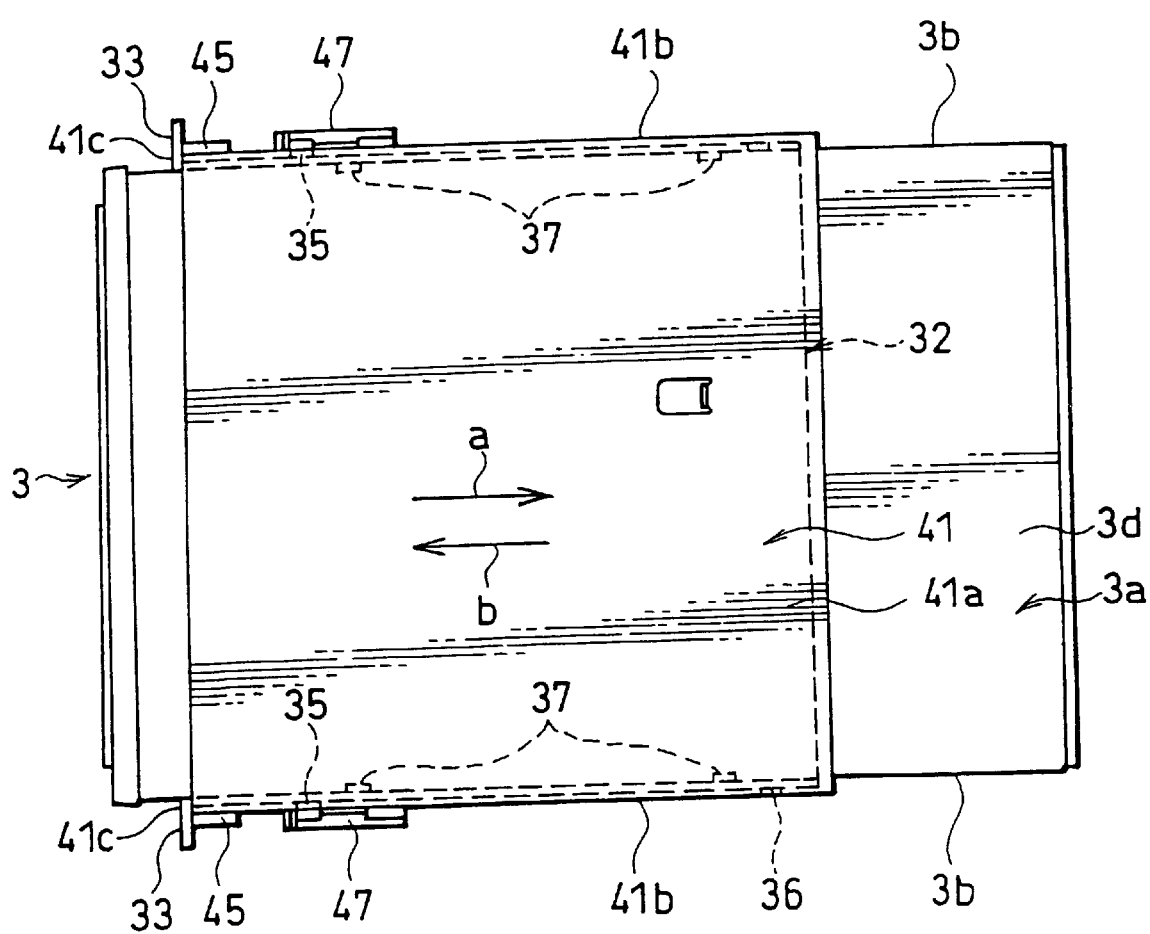
FIG. 15 is a plan view of a state that computer peripheral equipment and an adaptor are inserted and mounted in a mounting frame of a mounting apparatus for computer peripheral equipment.
Figure 16:
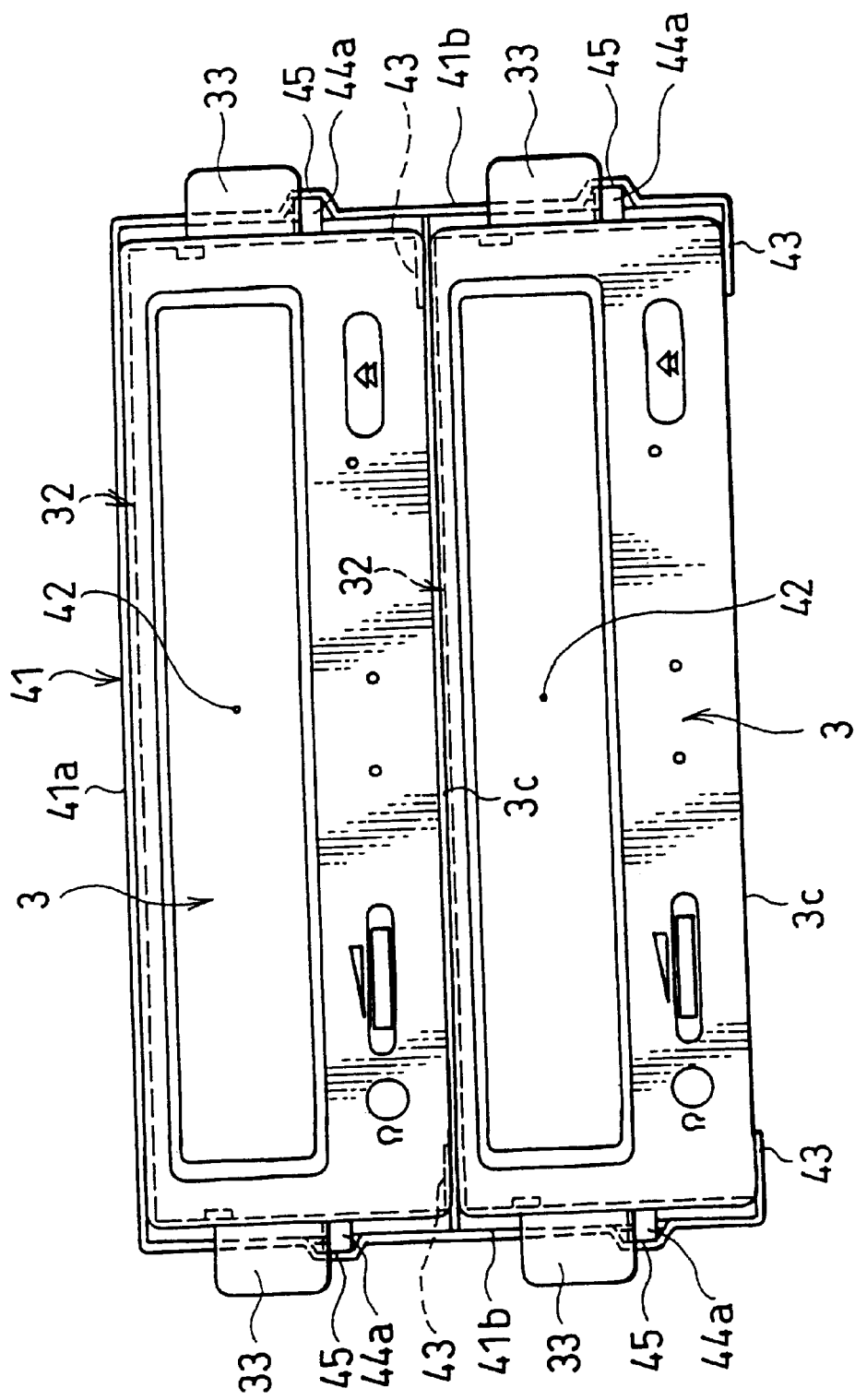
FIG. 16 is a front view of a state that computer peripheral equipment is inserted and mounted in upper and lower two stages in a mounting frame of FIG., 15.
Figure 17:
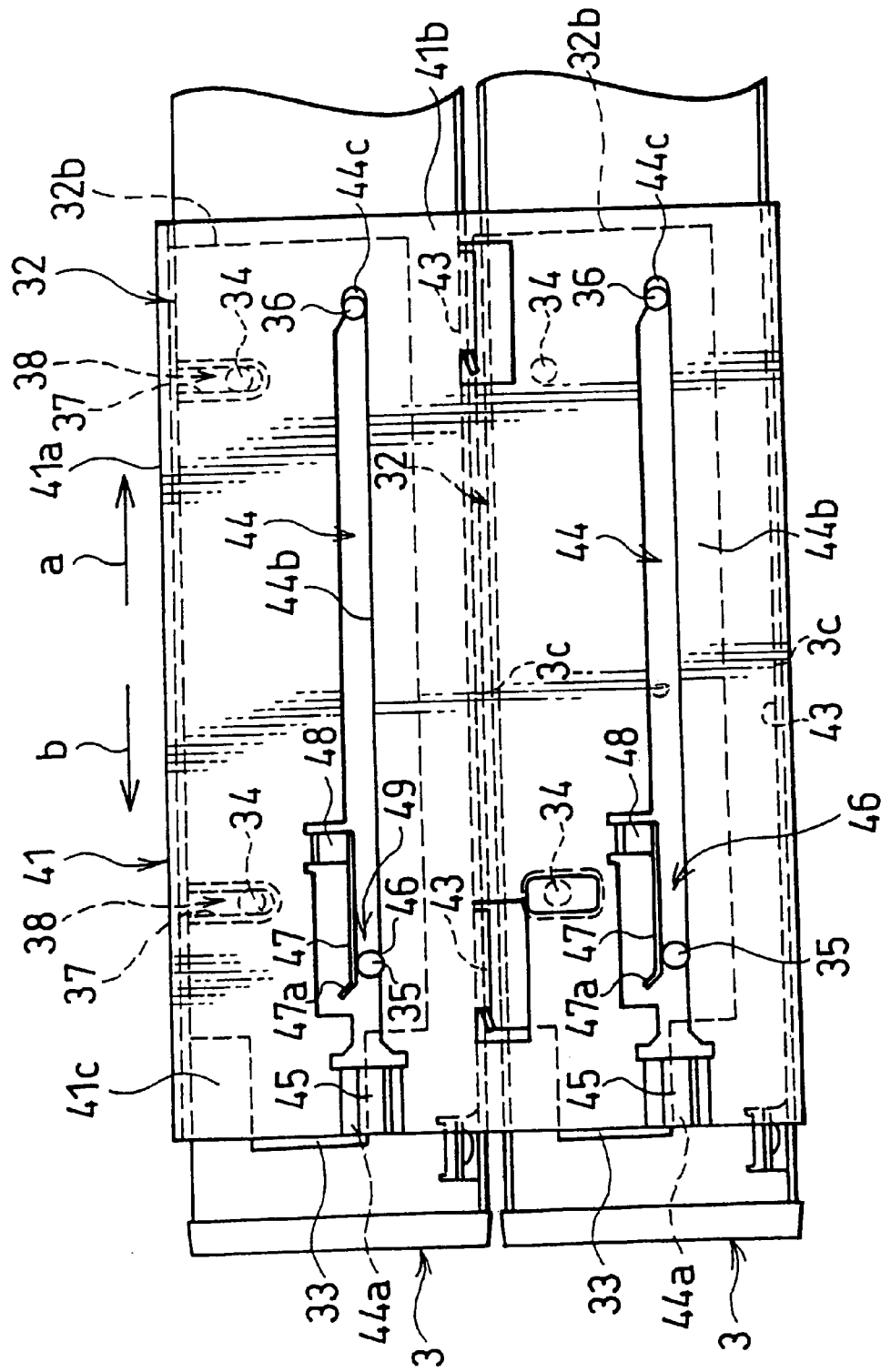
FIG. 17 is a side view of a mounting frame and computer peripheral equipment of upper and lower two stages of FIG., 15.

First, as shown in FIGS. 1, 3, and 12 to 16, the adaptor 32 is mounted on the optical disk drive device 3 or the like in a direction of arrow c in FIG. 3 from upward to downward, four outer guide pins 34 in total of the adaptor 32 constituting the first locating means 38 are inserted from the top into four vertical guide grooves 37 of the optical disk drive device 3 or the like, the top plate part 32a of the adaptor 32 is placed horizontally on the upper surface 3d of the outer cover 3a of the optical disk drive device 3 or the like, both left and right plate parts 32b of the adaptor 32 are inserted in parallel on both sides of both left and right sides 3b of the optical disk drive device 3 or the like, and the adaptor 32 is mounted horizontally on the upper part of the optical disk drive device 3 or the like. Then, the adaptor 32 can be removed in a direction of arrow d upward of the optical disk drive device 3 or the like, but the adaptor 32 is located in an immovable state with respect to arrows a and b which is a longitudinal direction with respect to the optical disk drive 3 or the like.

Accordingly, in a mounting state of the adaptor 32 on the upper part of the optical disk drive device 3 or the like, the adaptor 32 need not at all to screw them to the upper part of the optical disk drive device 3 or the like using a plurality of stop screws. However, the adaptor 32 may be temporarily stopped at the optical disk drive device by a single temporary stopping screw so that the adaptor 32 is not levitated upward (in a direction of arrow d) of the optical disk drive device 3 or the like during the inserting operation of the optical disk drive device 3 or the like into the mounting frame 41 described later. Further, the depth in a horizontal direction of at least one lower end portion of four vertical guide grooves 37 in total is partly deepened, and at least one of four inner guide pins 34 in total is elastically engaged with the deep portion of the lower end portion of the vertical guide groove 37 making use of elastic flexibility internally (in a direction opposite to each other) of both left and right plate parts 32b of the adaptor 32 whereby enabling to prevent the adaptor 32 from being levitated upward (in a direction of arrow d) of the optical disk drive device 3 or the like.

After the adaptor 32 has been horizontally placed on the upper part of the optical disk drive device 3 or the like in a manner as described above, the optical disk drive device 3 or the like integral with the adaptor 32 is inserted horizontally in a direction of arrow a into the insert part 42 of the mounting frame 41 while the adaptor 32 is left placed horizontally on the upper part, as shown in FIGS. 1 and 2, and 5 to 18, and both left and right ends of the bottom 3c of the optical disk drive device 3 or the like are placed horizontally on the pair of left and right place beds 43.

At this time, the adaptor 32 is inserted into the inside of the insert part 42 in a direction of arrow a, and four outer guide pines 35, 36 in total are inserted horizontally in a direction of arrow a into the pair of left and right horizontal guide grooves 4 of both left and right plate parts 41b of the mounting frame 41 with the outer guide pins 36 preceded and with the outer guide pins 35 succeeded.

Figure 18A:
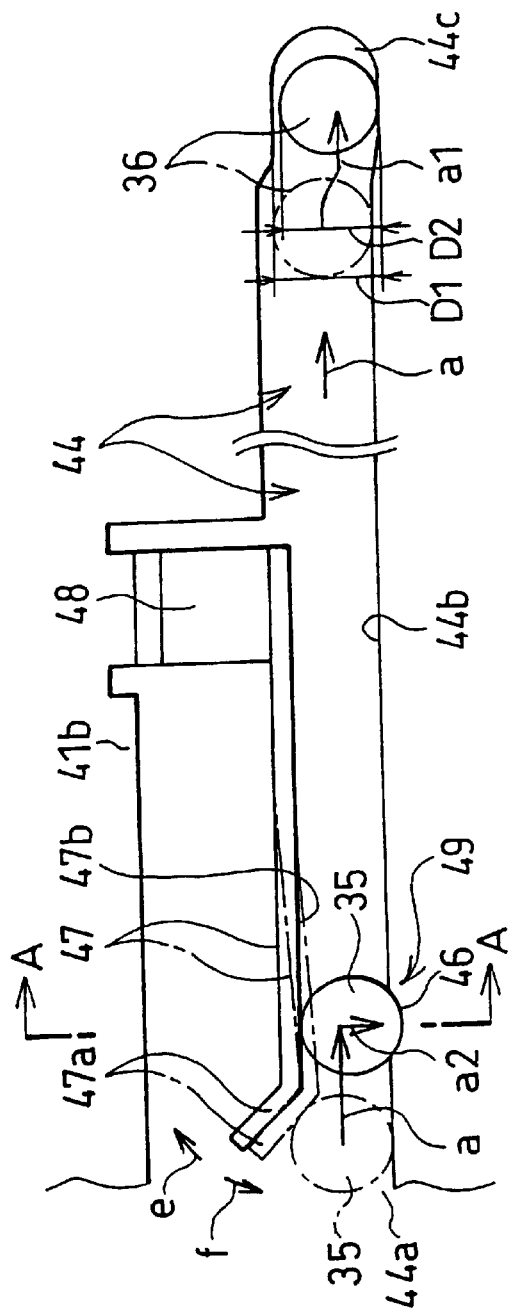
FIG. 18A is a partly cutaway side view showing in an enlarged scale second locating means of a mounting apparatus for computer peripheral equipment.
Figure 18B:
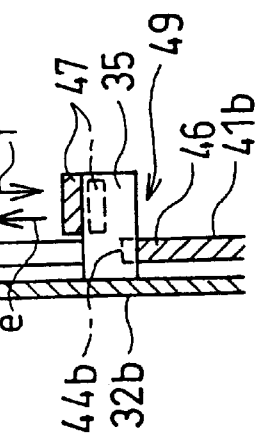
FIG. 18B is a sectional view taken on arrow A—A in a side view of FIG. 18A.

Then, as shown in FIGS. 2, 15–17, a pair of left and right gripping arts 33 of the adaptor 32 are placed in contact with the front ends 41c of both left and right plate parts 41b of the mounting frame 41, and immediately before completion of insertion of the optical disk drive device 3 or the like into the insert part 42 in a direction of arrow a, as shown by the solid lines in FIGS. 18A and 18B, the preceding pair of left and right outer guide pins 6 are dropped in a direction of arrow a1 into the rear end 44c passing through the difference in level part 44d of the lower horizontal surface 44b of the pair of left and right horizontal guide grooves 44, whereas the succeeding pair of left and right outer guide pins 35 constituting the second locating means enter in a direction of arrow a below the lower surface 47b of the plate spring part 47 so that the front end 47a of the plate spring part 47 is pushed upward against the spring force of the plate spring part 47 by the guiding action of the front end 47a inclined diagonally forwardly upward of the pair of left and right plate spring parts 47, and the outer circumferential lower sides of the pair of left and right outer guide pins 35 are elastically engaged (fitted) in a direction of arrow a2 in the pair of left and right guide pin engaging parts 46 which are depressions formed in the lower horizontal surface 44b of the pair of left and right horizontal guide grooves 44.

That is, as shown by the solid lines in FIGS. 18A and 18B, the outer guide pin 35 inserted in a direction of arrow a into the horizontal guide groove 44 is guided by the front end 47a of the plate spring part 47 to enter in a direction of arrow a into the lower part of the front end 47a side of the plate spring part 47, whereby the front end 47a side of the plate spring part 47 is flexed about the connecting part 45 side in an upper direction of arrow e from a position indicated by a chain line to a position indicated by a solid line against the spring force, and the outer guide pin 35 is elastically pressed and engaged (fitted) in a direction of arrow a2 in the guide pin engaging part 46 by the spring force in a lower direction of arrow f of the plate spring part 47.

A series of mounting work of the optical disk drive device 3 or the like into the mounting frame 41 is ended by the above procedure. The pair of left and right outer guide pins 35 of the adaptor 32 are engaged (fitted) in the pair of guide pin engaging parts 46 of the mounting frame 41, longitudinal (in directions of arrows a and b) of the adaptor 32 with respect to the mounting frame 41 is carried out, four inner guide pins 34 in total of the adaptor 32 have been already engaged four vertical guide grooves 37 of the optical disk drive device 3 or the like by the first locating means 38, and longitudinal (in directions of arrows a and b) locating of the optical disk drive device 3 or the like with respect to the adaptor 32 is done, whereby the optical disk drive device 3 or the like is located with high accuracy and fixed onto the pair of left and right place beds 43 of the mounting frame 41.

At this time, since the optical disk drive device 3 or the like is placed horizontally and located onto the pair of left and right place beds 43 of the mounting frame 41, no load of the optical disk drive device 3 is applied to the adaptor 32. Further, since the direction of arrow a2 which is a downward pressing direction of the pair of left and right outer guide pins 35 caused by the pair of left and right plate spring parts 47 acts on the direction for crimping the adaptor 32 on the upper surface 34 of the optical disk drive device 3 or the like, the optical disk drive device 3 or the like can be fixed stably within the mounting frame 41 in a state free from backlash in three directions, i.e., longitudinal, lateral and vertical directions.

Figure 22:
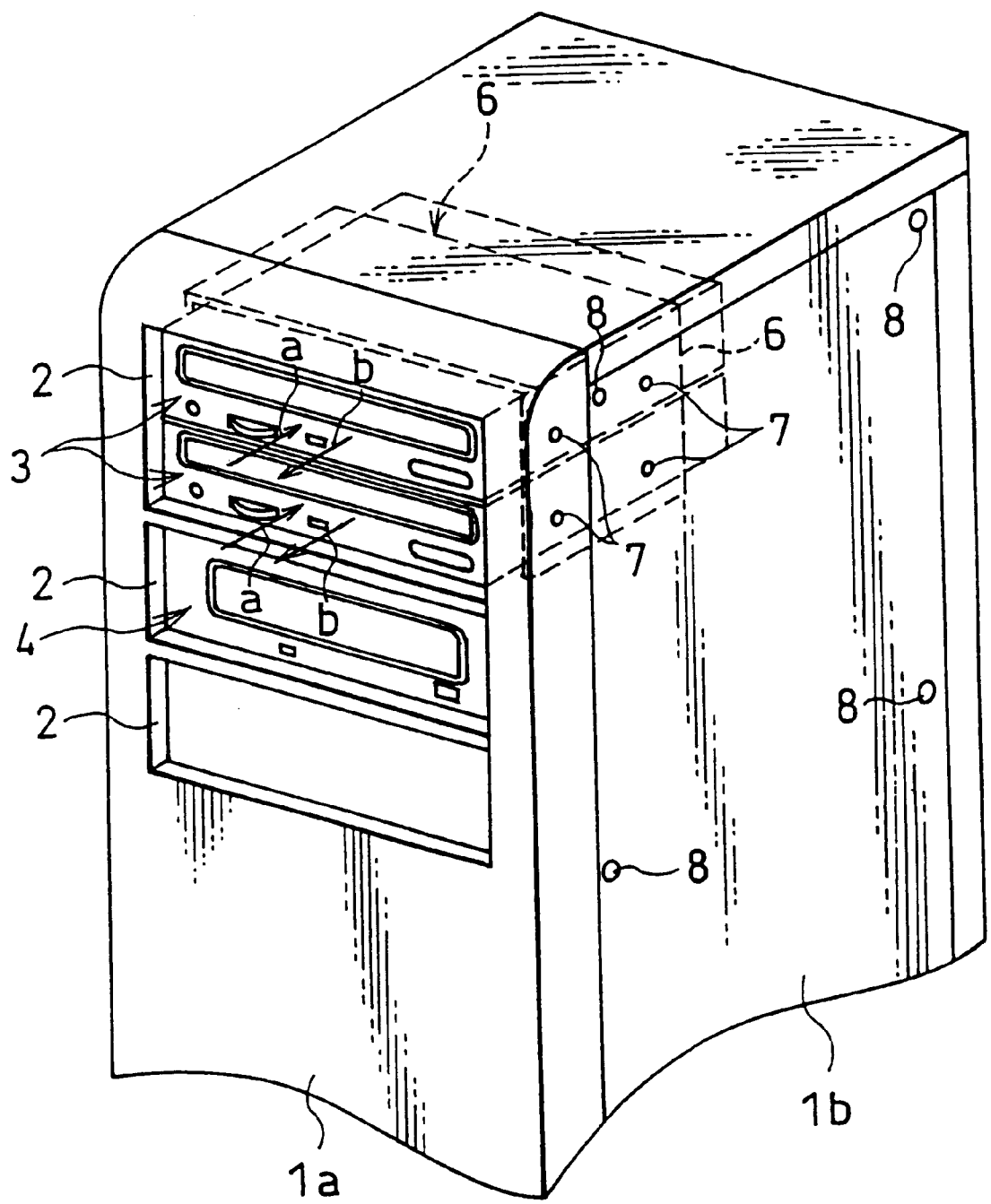
FIG. 22 is a perspective view showing a first related example of a mounting apparatus for computer peripheral equipment into a computer body.
Figure 23:
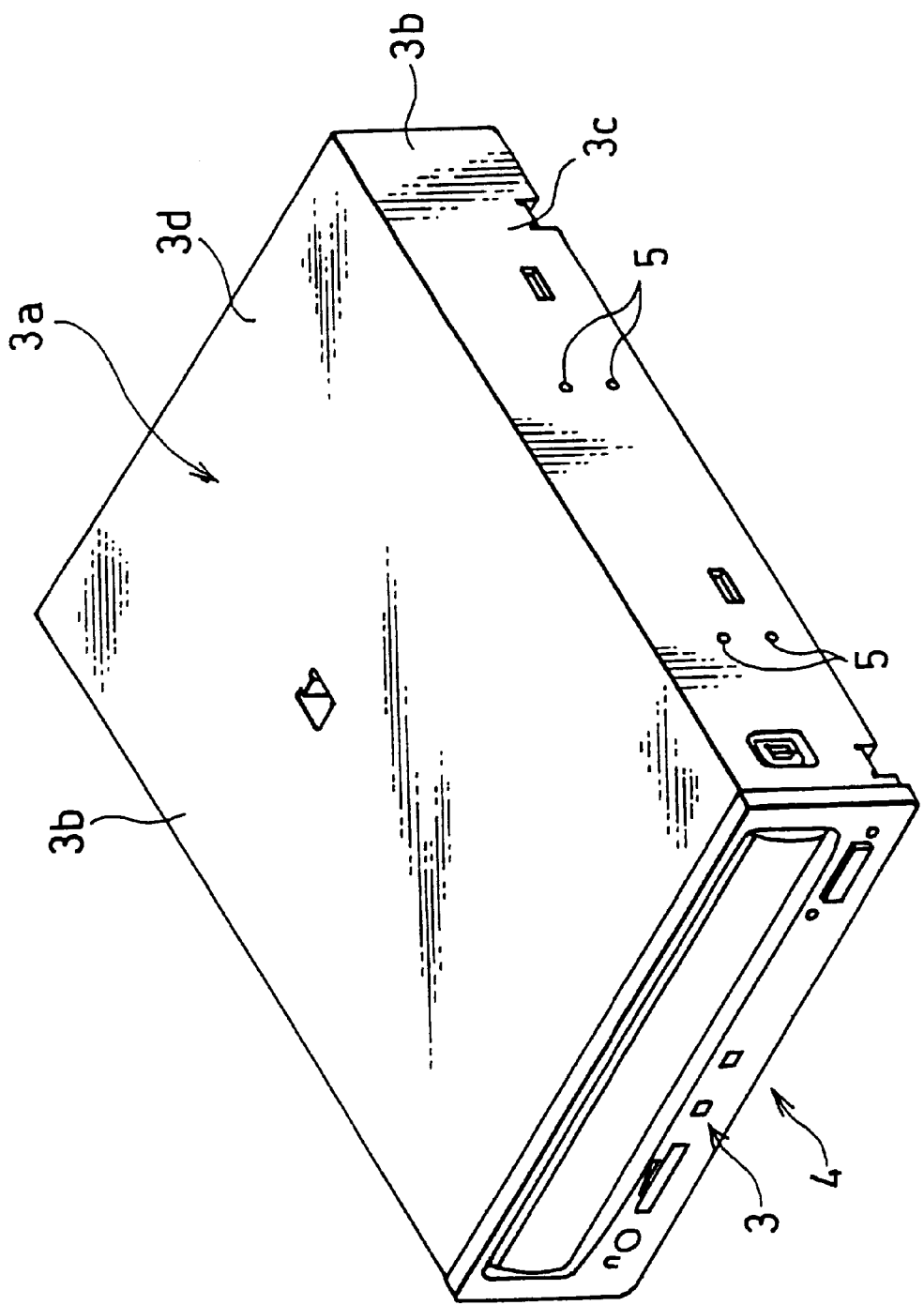
FIG. 23 is a perspective view for explaining general construction for mounting computer peripheral equipment into a computer body.
Figure 24:
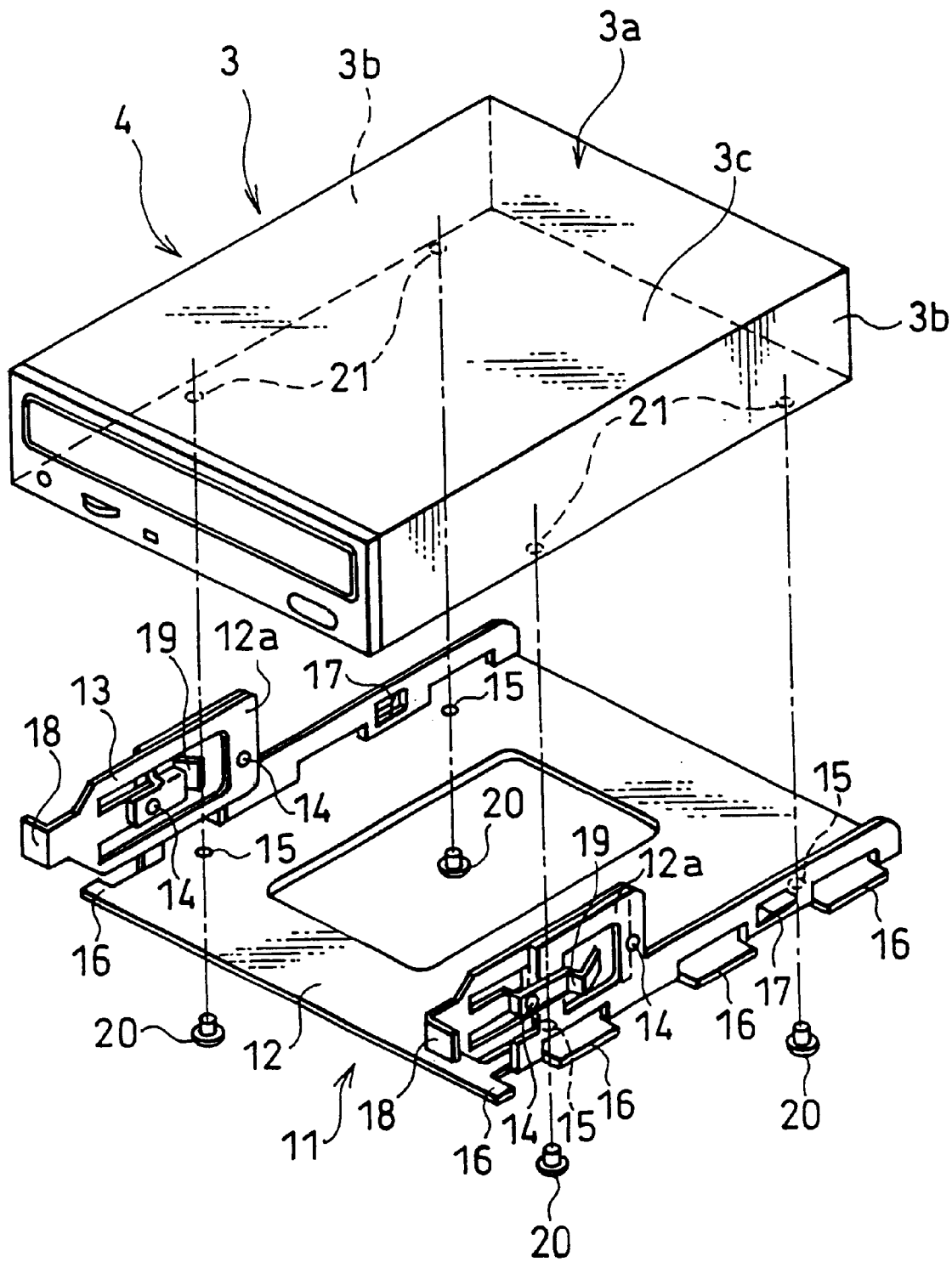
FIG. 24 is a perspective view showing an adaptor used in a second related example of amounting apparatus for computer peripheral equipment into a computer body.

Further, needless to say, at the time of mounting the optical disk drive device 3 or the like into the mounting frame 41, the pair of left and right side panels 1b of the computer body 1 shown in FIG. 22 need not at all be mounted or dismounted every time; and in mounting work of the optical disk drive device 3 or the like into the mounting frame 41, screwing work using a plurality of stop screw need not at all be done, but the optical disk drive device 3 or the like can be mounted within the mounting frame 41 simply by so-called one-touch operation.

It is noted that when the optical disk drive device 3 or the like is removed from the mounting frame 41, the procedure reversed to the aforementioned mounting operation may be carried out. That is, this can be done by a simple procedure such that the hand is laid on the pair of left and right gripping parts 33 of the adaptor 32 shown in FIG. 2, the adaptor 32 is pulled out horizontally in a direction of allow b against the spring force of the pair of left and right plate spring parts 47 as shown in FIG. 1 from the mounting frame 41, and afterward, the adaptor 32 is pulled out in a direction of allow d upward of the optical disk drive device 3 or the like.

Figure 19:
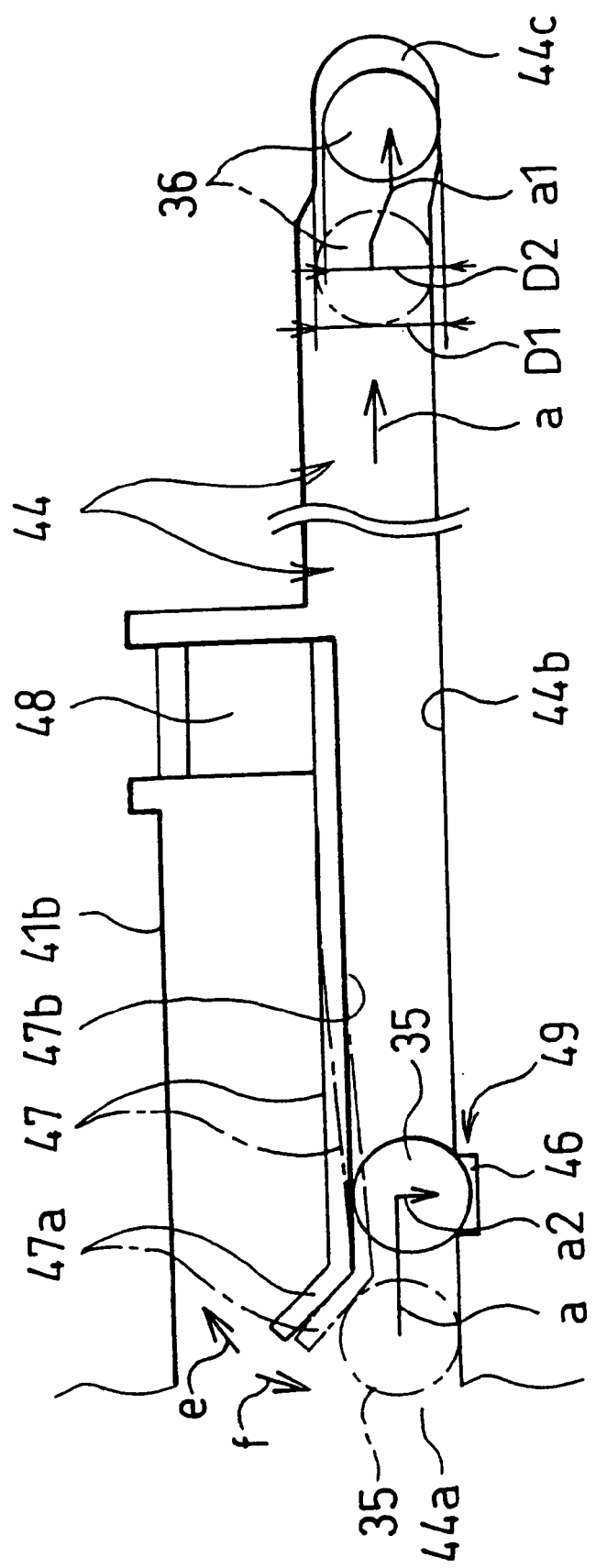
FIG. 19 is a partly cutaway side view showing a first modified example of first locating means.
Figure 20:
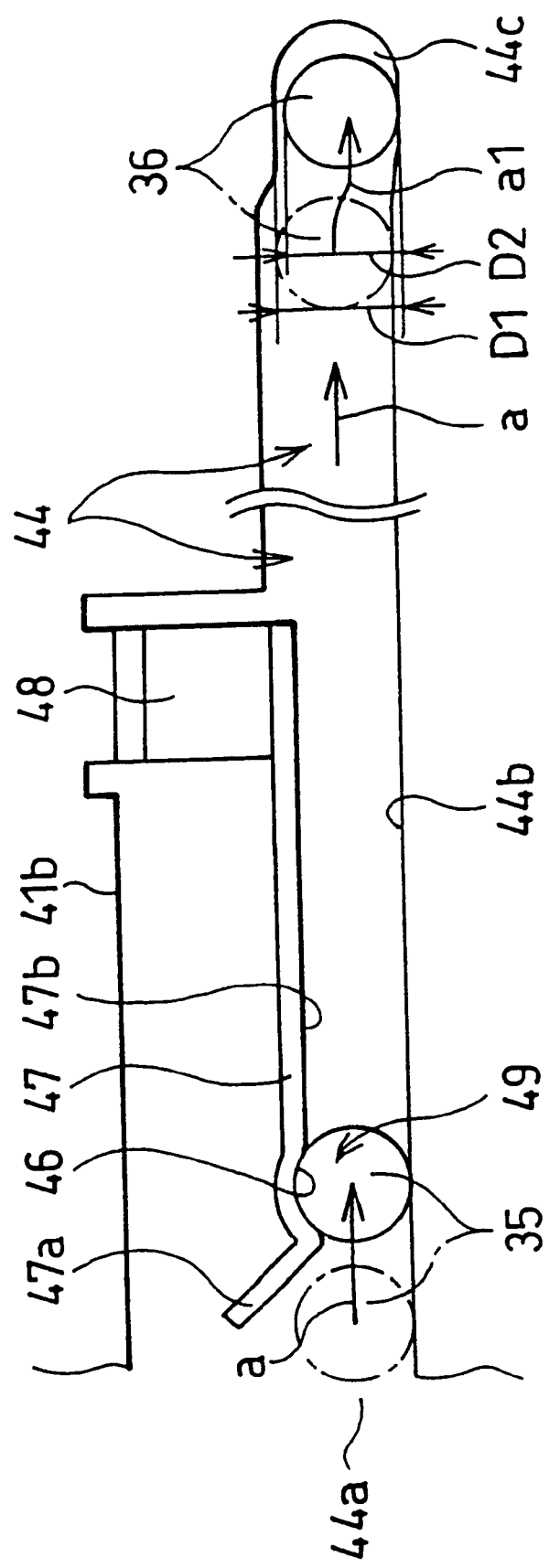
FIG. 20 is a partly cutaway side view showing a second modified example of first locating means.
Figure 21:
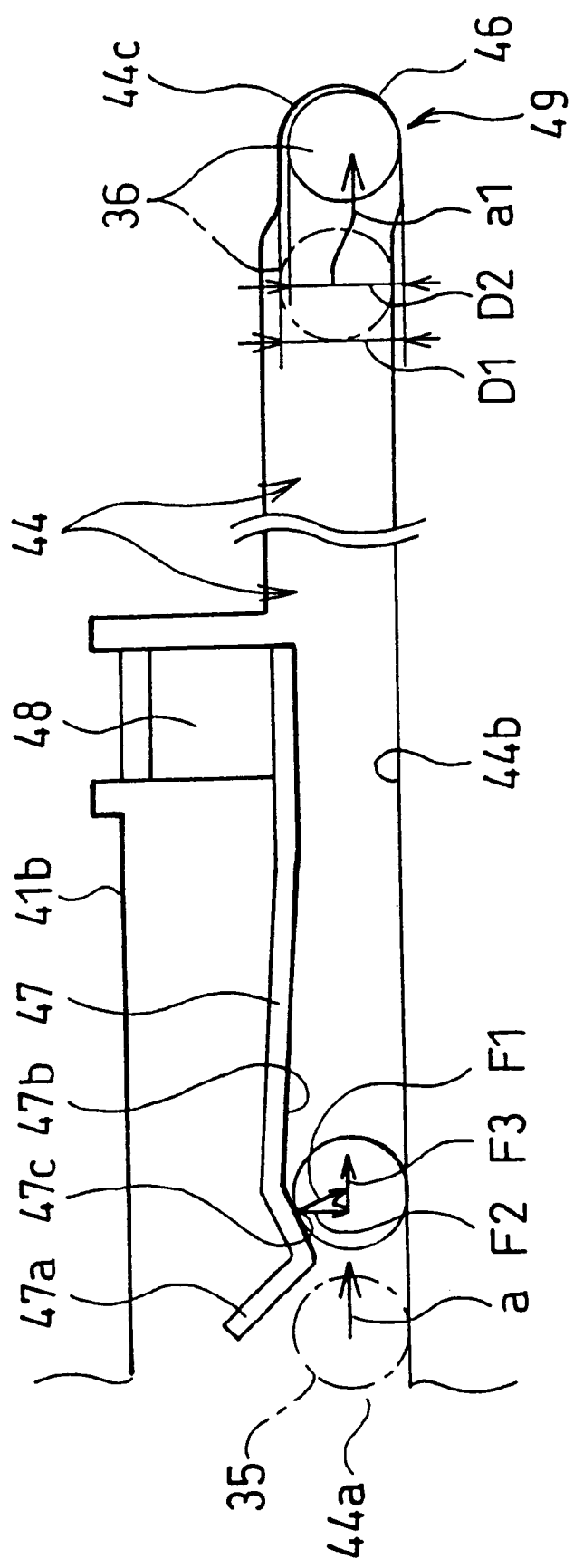
FIG. 21 is a partly cutaway side view showing a third modified example of first locating means.

FIGS. 19, 20, and 21 show a modification of a second locating means. FIG. 19 shows that a guide pin engaging part 46 is constituted to be an upwardly facing notch. FIG. 20 shows that a circular arc guide pin engaging part 46 is vertically inverted to the extreme end 47a side of the lower surface 47b of the plate spring part 47 from the lower horizontal surface 44b of the horizontal guide groove 44, and the outer guide pin 35 is located by the plate spring part 47 itself. FIG. 21 show that a cam surface 47c inclined so as to be directed rearward and downward (oblique downward in a direction of arrow a) is formed on the extreme end 47a side of the lower surface 47b of the plate spring part 47, and the outer guide pin 35 is pressed obliquely downward in a direction of allow a by a component force F2 whereby the outer guide pin 35 is pressed on the lower horizontal surface 44b of the horizontal guide groove 44 by the downward component force F2, the adaptor 32 is pressed in a direction of allow a through the outer guide pin 35 by the component force F2 in a direction of allow a, and the outer guide pin 36 on the rear side is pressed and located in a direction of allow a1 to the rear end 44c of the horizontal guide groove 44.

While in the foregoing, the preferred embodiments of the present invention have been described, the present invention is not limited to the above-described embodiments, but various changes can be made on the basis of the technical idea of the present invention. For example, the computer peripheral equipment of the present invention can be applied, other than various electronic equipment described in the present specification, to various electronic equipment that can be used while being mounted on the computer body.

What is claimed is:

1. A mounting apparatus for computer peripheral equipment comprising:
    an adaptor formed in a substantially channel-shape, having a top plate part, a left plate part suspended perpendicularly to and downward from a left end edge of said top plate part, a right plate part suspended perpendicularly to and downward from a right end edge of said top plate part, and detachably mounted to said computer peripheral equipment;
    first locating means for locating said adaptor in a longitudinal direction of said computer peripheral equipment by mounting said adaptor to said computer peripheral equipment;
    a mounting frame mounted within a computer body, having an insert part of said computer peripheral equipment and a place bed provided on said insert part, said computer peripheral equipment being inserted into said insert part in a longitudinal direction integral with said adaptor and placed horizontally on said place bed; and
    second locating means for elastically locating said adaptor in said longitudinal direction integral with said computer peripheral equipment into said insert part of said mounting frame in said longitudinal direction and in a vertical direction within said mounting frame.

2. The mounting apparatus for computer peripheral equipment according to claim 1, wherein said first locating means for locating said adaptor in said longitudinal direction with respect to said computer peripheral equipment is constituted by providing a vertical guide groove having one open end and a guide pin inserted vertically into said guide groove.

3. The mounting apparatus for computer peripheral equipment according to claim 1, wherein said second locating means for elastically locating said adaptor in said longitudinal direction and in said vertical direction within said mounting frame is constituted by a guide pin and a plate spring part for elastically compressing said guide pin to locate said computer peripheral equipment onto said place bed of said mounting frame through said adaptor.

4. The mounting apparatus for computer peripheral equipment according to claim 1, further comprising: a plurality of guide pins provided on a single surface of said left plate part and on a single surface of said right plate part of said adaptor; a plurality of guide pins provided on a left plate part and a right plate part of said mounting frame; and a plurality of horizontal guide grooves for guiding said plurality of guide pins.

5. The mounting apparatus for computer peripheral equipment according to claim 1, wherein left and right gripping parts are provided on a front end of said left plate part and said right plate part of said adaptor.

6. A mounting method for mounting computer peripheral equipment, comprising the steps of:
    locating an adaptor oriented in a longitudinal direction of computer peripheral equipment and mounting said adaptor, said adaptor formed in a substantially channel-shape having a top plate part, a left plate part suspended perpendicularly to and downward from a left end edge of said top plate part, a right plate part suspended perpendicularly to and downward from a right end edge of said top plate part, and detachably mounted to computer peripheral equipment; and elastically locating, in a mounting frame mounted within a computer body having an insert part of said computer peripheral equipment and a place bed provided on said insert part, said computer peripheral equipment being inserted into said insert part in said longitudinal direction integral with said adaptor and placed horizontally on said place bed, said adaptor inserted horizontally in said longitudinal direction integral with said computer peripheral equipment into said insert part of said mounting frame in said longitudinal direction and a vertical direction within said mounting frame.

7. The mounting method for computer peripheral equipment according to claim 6, wherein said longitudinal orientation of said adaptor and said computer peripheral equipment is carried out by providing a vertical guide groove having one open end and a guide pin inserted vertically into said guide groove.

8. The mounting method for computer peripheral equipment according to claim 6, wherein elastically locating said adaptor in said longitudinal direction and in said vertical direction within said mounting frame is carried out by providing a guide pin, by elastically compressing said guide pin, and by a plate spring part for locating said computer peripheral equipment on said place bed of said mounting frame through said adaptor.

9. The mounting method for computer peripheral equipment according to claim 6, further comprising the steps of: providing a plurality of guide pins on one surface of said left plate part and on one surface of said right plate part of said adaptor; providing a plurality of guide pins on a left plate part and a right plate part of said mounting frame; and providing a plurality of horizontal guide grooves for guiding said plurality of guide pins.

10. A recording/reproducing apparatus including a casing comprising a front surface provided with a recording medium insert opening, a top plate part, a bottom plate part, a left side plate part, and a right side plate part, wherein grooves extended from said top plate part to said bottom plate part and having edges adjacent to said top plate part are provided in pairs in said left and said right side plate parts.

11. The recording/reproducing apparatus according to claim 10, wherein an adaptor formed in a substantially channel-shape is mounted detachably by a top plate part, a left plate part suspended perpendicularly to and downward from a left end edge of said top plate part, a right plate part suspended perpendicularly to and downward from a right end edge of said top plate part; and guide pins provided on both said left and said right plates of said adaptor are inserted into said groove parts.

* * * * *